United States Patent
Byggmästar

(10) Patent No.: US 12,241,760 B2
(45) Date of Patent: Mar. 4, 2025

(54) METHOD AND ARRANGEMENT FOR LONG TERM DRIFT ANALYSIS

(71) Applicant: Beamex Oy AB, Pietarsaari (FI)

(72) Inventor: Mats Byggmästar, Pietarsaari (FI)

(73) Assignee: BEAMEX OY AB, Pietarsaari (FI)

( * ) Notice: Subject to any disclaimer, the term of this patent is extended or adjusted under 35 U.S.C. 154(b) by 636 days.

(21) Appl. No.: 17/601,760

(22) PCT Filed: Apr. 7, 2020

(86) PCT No.: PCT/FI2020/050225
§ 371 (c)(1),
(2) Date: Oct. 6, 2021

(87) PCT Pub. No.: WO2020/208300
PCT Pub. Date: Oct. 15, 2020

(65) Prior Publication Data
US 2022/0196447 A1    Jun. 23, 2022

(30) Foreign Application Priority Data
Apr. 12, 2019 (FI) ...................................... 20195298

(51) Int. Cl.
*G01D 18/00* (2006.01)
*G01D 3/032* (2006.01)
(Continued)

(52) U.S. Cl.
CPC .......... *G01D 18/008* (2013.01); *G01D 3/032* (2013.01); *G01D 3/08* (2013.01); *G05B 23/0232* (2013.01); *G08B 21/182* (2013.01)

(58) Field of Classification Search
CPC ........ G01D 18/008; G01D 3/032; G01D 3/08; G05B 23/0232; G08B 21/182
(Continued)

(56) References Cited

U.S. PATENT DOCUMENTS 3,922,091 A    11/1975    Suva et al.
9,354,091 B2    5/2016    Vaissiere
(Continued)

FOREIGN PATENT DOCUMENTS

CA    2677702 A1    9/2008
JP    2002228495 A    8/2002
(Continued)

OTHER PUBLICATIONS

International Search Report for PCT Application No. PCT/FI2020/050225 mailed Jul. 20, 2020 (4 pages).
(Continued)

*Primary Examiner* — Aditya S Bhat
(74) *Attorney, Agent, or Firm* — Merchant & Gould P.C.

(57) ABSTRACT

A method and arrangement keep track of the cumulative absolute drift of a measurement device, in connection with calibration actions performed by a calibrator. Measurement results are saved (22) in each measurement instant, and if they exceed a threshold value (23), an adjustment step is performed (24). Irrespective of the adjustment steps, the latest drift value (25) during the latest calibration interval is summed (26) with the previous cumulative drift value. The cumulative drift value, i.e. AbsDrift, is saved to a server, from where it can be illustrated visually (27). If there is an uncommon pattern or large cumulative drift present, an indication or alarm (28) can be sent to the user of the calibrator.

19 Claims, 2 Drawing Sheets

(51) Int. Cl.
  *G01D 3/08*   (2006.01)
  *G05B 23/02*  (2006.01)
  *G08B 21/18*  (2006.01)

(58) Field of Classification Search
  USPC .......................................................... 702/104
  See application file for complete search history.

(56) References Cited

U.S. PATENT DOCUMENTS

| | | | |
|---|---|---|---|
| 10,901,371 B2* | 1/2021 | Vaissiere | G04F 13/00 |
| 2013/0030746 A1 | 1/2013 | Vaissiere | |
| 2014/0213147 A1 | 7/2014 | Tanaka et al. | |
| 2015/0019151 A1* | 1/2015 | Vaissiere | G01D 18/006 |
| | | | 702/85 |
| 2018/0188083 A1 | 7/2018 | Moriyama et al. | |
| 2019/0013888 A1* | 1/2019 | Li | H03L 7/00 |
| 2019/0204124 A1 | 7/2019 | Moriyama et al. | |

FOREIGN PATENT DOCUMENTS

| | | |
|---|---|---|
| JP | 2005043121 | 2/2005 |
| JP | 2005043121 A | 2/2005 |
| JP | 3765985 | 4/2006 |
| WO | 2004/025415 A2 | 3/2004 |

OTHER PUBLICATIONS

Written Opinion for PCT Application No. PCT/FI2020/050225 mailed Jul. 20, 2020 (8 pages).

Finnish Search Report for Finnish Application No. 20195298 mailed May 11, 2019 (2 pages).

Li et al., "FLIGHT: Clock Calibration Using Fluorescent Lighting," Mobile Computing and Networking, 2012, pp. 329-340.

Stull, "Practical Meteorology: An Algebra-based Survey of Atmospheric Science," 2017, https://www.eoas.ubc.ca/books/Practice_Meteorology.

European Office Action received for EP Serial No. 20 722 626.7 on May 22, 2023, 6 pgs.

* cited by examiner

METHOD AND ARRANGEMENT FOR LONG TERM DRIFT ANALYSIS

This application is a National Stage Application of PCT/FI2020/050225, filed 7 Apr. 2020, which claims benefit of Ser. No. 20/195,298, filed 12 Apr. 2019 in Finland, and which applications are incorporated herein by reference. To the extent appropriate, a claim of priority is made to each of the above disclosed applications.

FIELD OF THE INVENTION

The present invention relates generally to measurement devices or sensing devices, and more precisely to calibrating devices, i.e. calibrators, arranged to measure or sense various different physical quantities or environmental parameters.

BACKGROUND OF THE INVENTION

Various measurement devices are used in factories and automated production lines to ensure a properly executed procedure in manufacturing or processing the desired products. The measurement devices may be used to track physical quantities (parameters) within a product such as electric voltage or current of an electric apparatus, and/or environmental parameters within parts of the apparatus or surrounding it, such as temperature or pressure. Automated production or handling lines can also be provided with various measurement devices or sensors which may detect properties of the handled item or product or some intermediate product, or some ambient parameter present e.g. in a processing chamber, e.g. the temperature or humidity.

Measurement devices need to be calibrated from time to time because the measurement devices experience e.g. various environmental conditions and because the internal parts may wear during the lifetime of the device. Also the production or handling process itself may affect the measurement device, e.g. through contamination of a relevant detector, and additionally, the results of the measurement device may just float, when considering the results over a longer period of time. This may cause cumulative error in the measured quantity. Calibrating means comparing the measurement value(s) of the device to a calibration standard, which has a known accuracy. Usually, calibrators used in field conditions are used by appropriately dedicated personnel to perform a single calibration action with a given single measurement device, or a series of plural calibration actions in a factory consisting of all devices requiring calibration performed in a subsequent fashion. Regular field calibrators may concentrate on a singular measurement step or a single measurement group for a given device (with several measured parameter values) and store the respective results until the calibration is completed for the calibrated device. Alternatively, the data is stored locally in the calibrator until the data can be sent to a cloud or database service, where the sending can be performed after all the measurements have been completed when further, the device has a wireless or a wired access to a respective server of the cloud or database service. In any case, the focus of the calibration process is in tracking the measurement error and adjusting the device if possible, accordingly. When the calibration procedure is repeated later, the same action (measuring and possibly adjusting) is followed in order to correct the results obtained by the measurement device. The calibration process can of course be repeated for all desired devices e.g. in the factory or in the production line.

Reference WO 2004/025415 ("Casto") describes a calibration process management system and method. Casto applies a method where there is a configured user interface, a configured communications link capable to communicate with a calibration testing unit and the many units under test. The software system manages the UI and the communications link so that the operator may calibrate the plurality of units under test. The calibrated units under test are tracked using a permanent unique identifier and a dynamic unique identifier. The first of these is assigned during creation of an object, and the latter is assigned any time the object is modified. There is also an entity named as a globally unique identifier (GUI), actually two of them, where the first GUI is in practice the permanent unique identifier and the second GUI is the dynamic unique identifier. In summary, the various calibration data is managed in a database using these three identifiers. Reference Casto is thus only about data addressing, management and retrieval.

Reference U.S. Pat. No. 9,354,091 ("Vaissiere") describes a method for determining a calibration time interval for a calibration of a measurement device. This allows for safe optimization of calibration time intervals between consecutive calibrations. After two calibrations, the time for the third calibration is determined based on measurement error in both the first and second calibrations. There are further probability density functions for the measurement errors due to calibration uncertainties inherent to first and second calibrations. As a result, the needed calibration interval time is based on the drift occurred during the previous calibration interval. Similarly, the decision for the next time period is always performed based on the previous time period. Claim 7 of Vaissiere can be summarized in a way, where a next calibration time instance is determined so that a still acceptable maximum error is not exceeded based on a given probability density function.

The problem in prior art is that references Casto or Vaissiere do not discuss a concept of cumulative drift determination which would be highly useful in illustrating the calibration results and for tuning the calibration time interval for a more reasonable time value depending on the situation.

SUMMARY OF THE INVENTION

The present invention introduces a method and a system where a cumulative drift within measurements subject e.g. to a calibration scheme can be calculated and stored, and possibly also illustratively determined and stored. The system may comprise a calibrator and a processor together with a data storage device, where the latter may be a memory element. The processor and the memory can be part of the calibrator. However, the system may also have an external server where the locally measured data with the calibrator in the field environment can be transmitted to the external server via a wired or a wireless connection. The external server can locate in the cloud or database service.

In other words, the present invention introduces an arrangement to detect and store cumulative drift in measurements performed by a measurement device, wherein the arrangement comprises:

a calibrator connectable to the measurement device at given time instants, which is configured to measure at least one quantity at the given time instants, and to save respective measurement results into a memory, and if a measurement error of the respective measurement result exceeds a predetermined threshold value, the calibrator is arranged to correct the respective measurement result according to an adjustment step within a respective measurement instance.

The arrangement is characterized in that:

the arrangement comprises a controller, which is configured to compare the unadjusted result of the measurement instance to the adjusted result of the previous measurement instance, thus obtaining a latest drift value during the latest calibration time interval between the two consecutive measurement instances, wherein further the controller is configured to update a cumulative drift value in the memory by summing the latest drift value to the previous cumulative drift value, which cumulative drift value then comprises the drift of the results of the measurement device occurred since an operation of the measurement device has started or since a predetermined reference time instant during an operation of the measurement device.

In an embodiment of the arrangement according to the invention, the arrangement comprises the controller further configured to perform the summation for the cumulative drift value in each consecutive measurement instance independently of whether the correcting according to the adjustment step has been performed or not.

In an embodiment of the arrangement according to the invention, the arrangement comprises the controller further configured to decide:

if the cumulative drift value exceeds a drift threshold value in just a few measurement instances, setting the calibration time interval between two consecutive measurement instances to a shorter value, and if the cumulative drift value does not exceed a drift threshold value in more than a preset number of measurement instances, setting the calibration time interval between two consecutive measurement instances to a longer value.

In an embodiment, the preset number of measurement instances is a limit configurable by a user in the system, and in a further embodiment, this preset number is set to be ten.

In an embodiment of the arrangement according to the invention, the arrangement comprises:

the controller which is configured to illustrate the cumulative drift values as a function of time or as a function of calibration instants in user output means.

In an embodiment of the arrangement according to the invention, the arrangement comprises:

resetting the predetermined reference time instant, when the calibration time interval has been set to a different value, allowing cumulative drift observation only with the reset calibration time interval.

In an embodiment of the arrangement according to the invention, the arrangement comprises:

the controller which is configured to forecast future drift based on the cumulative drift variations.

In an embodiment of the arrangement according to the invention, the arrangement comprises:

the controller which is configured to observe whether the cumulative drift accelerates or decelerates during a preset longer period of time.

In an embodiment of the arrangement according to the invention, the arrangement comprises:

the controller which is configured to observe whether there are oscillations in the cumulative drift during a preset longer period of time.

In an embodiment of the arrangement according to the invention, the arrangement comprises:

the controller which is configured to trigger an alarm to a user of the calibrator if a positive observation result is obtained.

According to a second aspect of the invention, there is disclosed a method to detect and store cumulative drift in measurements performed by a measurement device, wherein the method comprises the steps of:

connecting a calibrator to the measurement device at given time instants, which is configured to measure at least one quantity at the given time instants, and saving respective measurement results into a memory, and if a measurement error of the respective measurement result exceeds a predetermined threshold value, correcting the respective measurement result by the calibrator according to an adjustment step within a respective measurement instance.

The method is characterized in that it further comprises the steps of:

comparing, in a controller, the unadjusted result of the measurement instance to the adjusted result of the previous measurement instance, thus obtaining a latest drift value during the latest calibration time interval between the two consecutive measurement instances, wherein further updating, in the controller, a cumulative drift value in the memory by summing the latest drift value to the previous cumulative drift value, which cumulative drift value then comprises the drift of the results of the measurement device occurred since an operation of the measurement device has started or since a predetermined reference time instant during an operation of the measurement device.

Similar embodiments are possible in connection with the method as disclosed above in connection with the arrangement.

According to a third aspect of the invention, there is disclosed a computer program product to detect and store cumulative drift in measurements performed by a measurement device, where the computer program product comprises program code adapted to perform the following steps, when the computer program is executed on a processor of a data processing device:

after connecting a calibrator to the measurement device at given time instants, measuring at least one quantity at the given time instants, and saving respective measurement results into a memory, and if a measurement error of the respective measurement result exceeds a predetermined threshold value, correcting the respective measurement result by the calibrator according to an adjustment step within a respective measurement instance.

It is characterized in that the following steps are adapted to be performed as well:

comparing, in a controller, the unadjusted result of the measurement instance to the adjusted result of the previous measurement instance, thus obtaining a latest drift value during the latest calibration time interval between the two consecutive measurement instances, wherein further updating, in the controller, a cumulative drift value in the memory by summing the latest drift value to the previous cumulative drift value, which cumulative drift value then comprises the drift of the results of the measurement device occurred since an operation of the measurement device has started or since a predetermined reference time instant during an operation of the measurement device.

DETAILED DESCRIPTION OF THE INVENTION

The present invention introduces a system, a device and a method for detecting, calculating, saving, and possibly illustrating a total drift of the measurement results obtained by a measurement device over a given period of time. The period of observed time can in one embodiment be a long period of time, thus allowing to observe a long term behaviour of the measurement device. This information concerning the total drift of the measurement results can be e.g. used in tuning the calibration time interval (i.e. the required temporal gap between subsequent calibration times), or in general, calibration time instants, to more reasonable temporal locations. As an example, the value of the total drift of the measurement results can be used to directly decide, whether to initiate an instant calibration action for the observed measurement device. According to the present invention, it may also illustrate to the user of the device, to the maintenance worker or supervising officer, how the drift of the measurement result behaves (i.e. fluctuates) in a measurement device as a function of time, and whether there are any interesting or alarming patterns in the behaviour of the drift. The results from the performed actions can be used as quality information on the inspected device, while possibly further triggering maintenance actions on the inspected device, or even replacement of the malfunctioning device with a new one, or initiating such a replacement with a corresponding request in the control system managing the measuring devices. The drift information is also useful in forecasting the future behaviour of the inspected device, and even possibly, a remaining lifetime estimate for the inspected device. In latter instances, when discussing simply "drift", it is meant as "the drifting of the measurement results over time".

Figure 1:
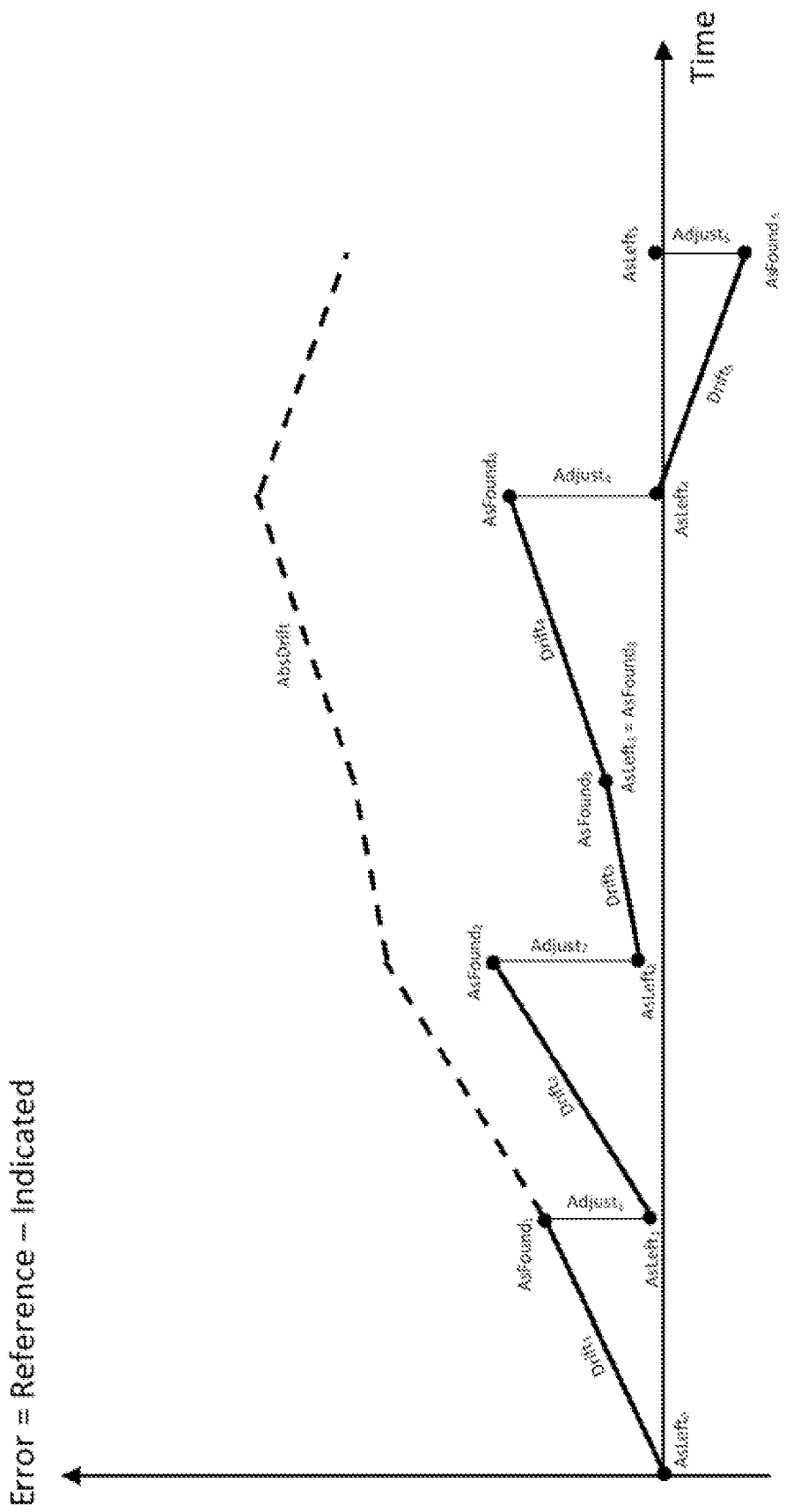
FIG. 1 illustrates a principle of calculating total drift as a function of time when performing calibrations of a measurement device.

FIG. 1 illustrates an embodiment of the working principle of the algorithm behind the present invention. The measurement device under examination can basically measure or detect any quantity, which generally can be sensed or detected with a dedicated sensor or sensor system, or with other appropriate detection means. The starting moment in the graph is $t_0=0$, when the drift is also zero. When the measurement device is switched on and functioning properly, the detected and shown measurement result always deviates from the "true" value. The deviation D can be defined as:

$$D = R_{ref} - R_{ind}, \quad (1)$$

where $R_{ref}$ is the reference (correct) value in the measurement, and $R_{ind}$ is the indicated, shown measurement result by the measurement device itself.

In moment $t_1$, the first checking step of the measurement device is performed. The checking step can be performed by the calibrator, or by the measurement device itself. The measured result is "AsFound$_N$" and it can be defined that the new measurement result depends from the previous measurement result and the occurred drift by:

$$AsFound_1 = AsLeft_0 + Drift_1, \quad (2)$$

or in general form:

$$AsFound_N = AsLeft_{N-1} + Drift_N \quad (3)$$

Next, the measuring device or the calibrator checks whether the deviation D is larger than a predetermined threshold value. If $|D| > D_{threshold}$, the system adjusts the measurement value so that the result will stay within the predetermined threshold value. In order words, an adjustment is made where the adjusted value AsLeft$_1$ is defined by:

$$AsLeft_1 = AsFound_1 + Adjust_1 \quad (4)$$

or in general:

$$AsLeft_N = AsFound_N + Adjust_N \quad (5)$$

If the AsFound$_1$ is a positive value and above the threshold value, the adjustment value Adjust$_1$ is a negative value.

If the $|D| < D_{threshold}$, the system leaves the measurement value as unadjusted in such a moment of time $t_N$ (N=1, 2, 3, . . . ), i.e.:

$$AsLeft_N = AsFound_N \quad (6)$$

The present invention works in a continuous way independently of the adjustments made or discarded in each measurement instant N, where N=1, 2, 3, . . . . This means that the present invention keeps a track of quantity AbsDrift which is defined as:

$$AbsDrift_N = \sum_{i=1}^{N} Drift_i \quad (7)$$

The value of AbsDrift is thus independent of whether the adjustment had to be made or not, i.e. whether the:

$|AsFound_N| > D_{threshold}$ is fulfilled or not.

The AbsDrift will cumulatively keep track of the drift value of the measurement, no matter how many adjustments are made in different time instants $t=t_1, t_2, t_3, \ldots$ and so on. In general form, the cumulative AbsDrift value can be expressed as:

$$AbsDrift_N = AbsDrift_{N-1} + AsFound_N - AsLeft_{N-1} \quad (8)$$

where N is a positive integer.

In an embodiment of the invention, the above procedure can be implemented in an alternative manner. In this embodiment, the AbsDrift can be calculated based on an existing, old AsFound/AsLeft calibration history data. For example, there can be a five years calibration history of an instrument, which has been calibrated once per year. In the stored data there are five pieces of AsFound/AsLeft data ($t_1$-$t_5$) after the starting instant which was $t_0=0$. As disclosed in the previous equations, AbsDrift can be calculated from the existing calibration history data comprising the AsFound and AsLeft values, and the result reveals the total drift over five consecutive years. This means that the AbsDrift can be calculated in any given time as a singular calculation action consisting all desired history data already stored and available in the system. With the singular calculation action, it is meant all desired calculational steps in view of the above equations for obtaining the value of AbsDrift at the calculation instant $t=X$.

Figure 2:
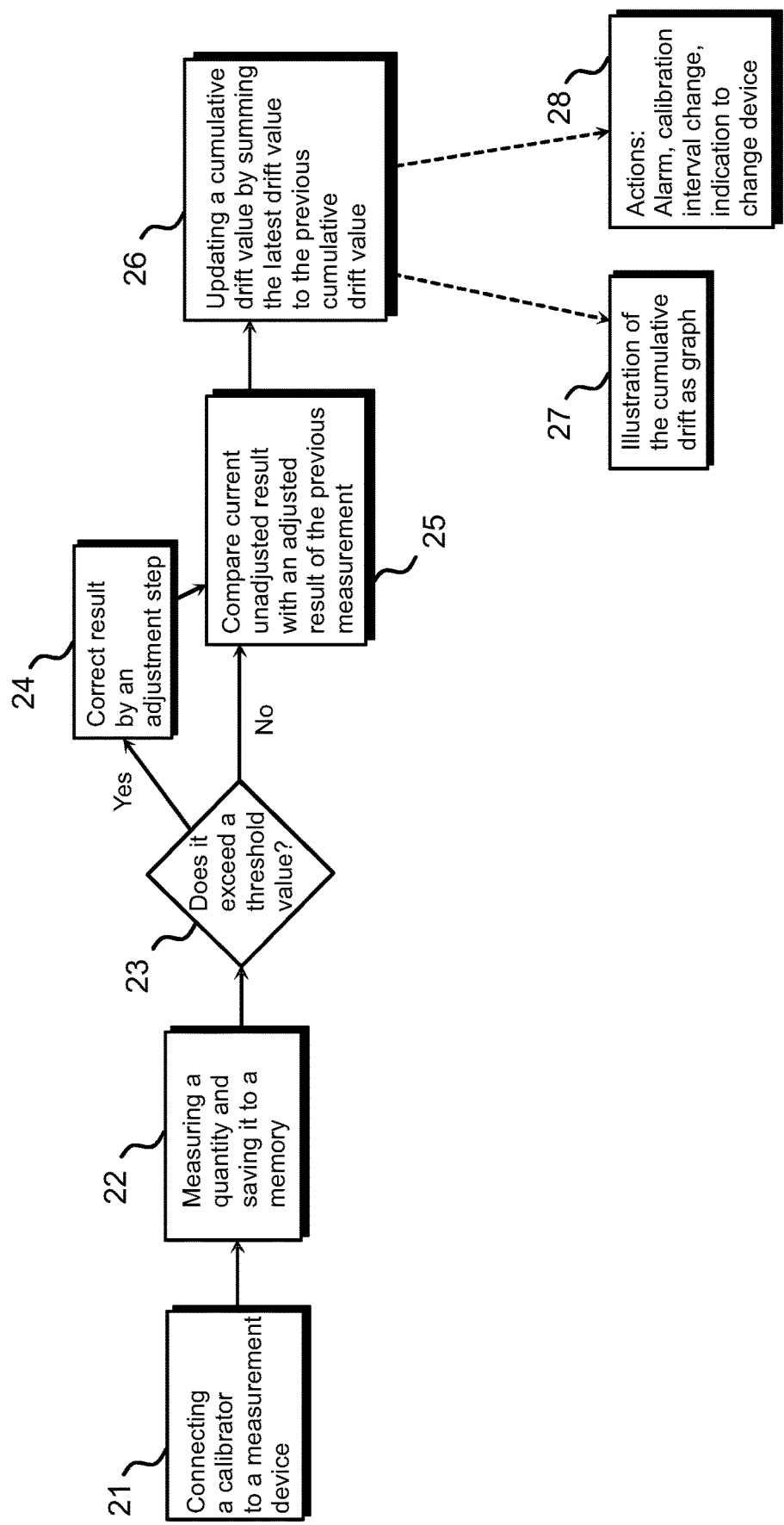
FIG. 2 illustrates a flow chart of an embodiment of the principle according to the present invention.

FIG. 2 illustrates the above embodiment of a method according to the present invention in a form of a flow chart. When the measurement instant arrives, at first the user connects his/her calibrator to a measurement device 21. This may happen in connection with a single measurement device, or e.g. during plural calibration actions of several measurement devices in a factory or along an automated process line. With the reference data available from the calibrator, the user is able to measure 22 a desired quantity of the measurement device, and the current measurement data is saved 22 to a memory of e.g. the calibrator. The absolute value of the measured quantity itself is checked and if it exceeds a predetermined threshold value 23, the measurement result is corrected by an adjustment step 24, thus cancelling at least partially the effect of the total drifting. If the measurement result is close enough to the optimal value, i.e. under the predetermined threshold value, the method just goes to the next step. In there, the current unadjusted measurement result is compared 25 in the controller with the adjusted result of the previous measurement instance. In this way, the drift occurred in the latest measurement interval is obtained. In the memory of the controller, there is always an updated cumulative drift value from the previous measurement instants. In the final step of the calculation algorithm itself, the cumulative drift value is updated 26 by summing the latest drift value to the previous cumulative drift value. The result is AbsDrift, the cumulative drift over a possibly long period of time, which does not take into account the number of adjustment steps performed during the operation of the measurement device. The AbsDrift can be stored as a numerical piece of data in a calibrator or a server or even in a cloud or database service, but it can also be illustrated as a graph 27 showing the long-term behaviour of the measurement device's operation in a practical manner. Finally, the updated cumulative drift value can be used to trigger various actions 28. If it is too high, an alarm can be triggered e.g. to the calibrator user or to some other managing person or a person responsible in the monitoring of the devices. The calibration interval can be set to be changed to a shorter or longer period based on the speed of the "rising" of the cumulative drift. The pattern or behaviour of the cumulative drift can be inspected, and if there is a drastic change in the change speed of the cumulative drift compared to history, this is an interesting piece of information. Oscillations in the cumulative drift can be seen as well. Also future behaviour of the measurement device can be forecasted. Even the remaining service life estimate may be given to the measurement device. In the most severe cases, there can be triggered an alarming information, that the measurement device is not reliable anymore because of very high drifting of its measurement results; and the alarming information may then provide instructions to the user to change the measurement device immediately to a new one.

The method according to the present invention is applicable as a computer program product in one aspect of the invention. In this situation, the method steps are executed in a processor of a data processing device in a form of program code. The computer program can be stored in various forms as the computer program product.

An advantage of the present invention is that it allows a monitoring person or instance to keep track of the measurement device's performance over a long period of time, independently of the performed adjustments during that long period. While the adjustments will keep the actual results satisfactory over the long period of time, the AbsDrift value will tell, whether the drift has occurred e.g. linearly, or alternatingly, or in some possibly random manner. It is also possible that at first the drift is only moderate, and later it will accelerate to an untolerable value. This kind of a result is an indication that something is badly wrong in the measurement device, and it should e.g. be interchanged to a novel measurement device. Furthermore, it is easier to compare different measurement devices and their performances by comparing their AbsDrift values, in case both have the same $t_0=0$ (i.e. the initiation or starting times of the devices). It is also possible to draw a graph of the AbsDrift value, and to save the results as a group of data values or as a graph either in the calibrator, or in an external server in the monitoring room, or in a server of a cloud or database service in the internet. The pieces of data can also be saved one measurement result at a time, where the database will consist of the current and previous measurement results, adjustment values, and AbsDrift values; or just part of them such as AbsDrift value only. The AbsDrift results can be exported at a desired time from the server, computer or device storing these pieces of data. The present invention thus gives good piece of information on the condition of the measurement device's drifting patterns over a short period but also over a long period of time. This is highly useful in many industrial, such as automation, manufacturing, and object handling, and chemical process type of applications as well, in any factory or automation line comprising at least one measurement device. Of course the invention is applicable to a measuring arrangement comprising only a single measurement device, without any larger factory-like of an arrangement.

A further advantage of the invention is that the calibration time interval of the measurement device can be tuned based on the AbsDrift value. Also the AbsDrift value gives an indication, what is the quality of the measurement device, and even the remaining lifetime estimate of the measurement device can be achieved based on the AbsDrift value.

The present invention is not restricted merely to the embodiments disclosed above but the present invention may vary within the scope of the claims.

The invention claimed is:

1. An arrangement to detect and store cumulative drift in measurements performed by a measurement device, the arrangement comprising:
   a calibrator connectable to the measurement device at given time instants, wherein the calibrator measures at least one quantity at given measurement instants, and to save respective measurement results into a memory, and if a measurement error of the respective measurement result exceeds a predetermined threshold value, the calibrator is arranged to correct the respective measurement result within a respective measurement instant according to an adjustment step,
   a controller comparing the unadjusted result of the measurement instants to the adjusted result of the previous measurement instant, thus obtaining a latest drift value during a latest calibration time interval between two consecutive measurement instants,
   wherein
   the controller updates a cumulative drift value in the memory by summing the latest drift value to the previous cumulative drift value, which cumulative drift value then comprises the drift of the results of the measurement device occurred since an operation of the measurement device has started or since a predetermined reference time instant during an operation of the measurement device,
   wherein a magnitude of the cumulative drift value and a number of measurement instants associated with the magnitude of the cumulative drift value are applied for changing the calibration time interval of the measurement device.

2. The arrangement according to claim 1, wherein the controller performs the summing for the cumulative drift value in each consecutive measurement instant independently of whether the correcting according to the adjustment step has been performed or not.

3. The arrangement according to claim 1, wherein the controller decides:

if the cumulative drift value exceeds a drift threshold value in only some measurement instants, setting the calibration time interval between two consecutive measurement instants to a shorter value, and if the cumulative drift value does not exceed a drift threshold value in more than a preset number of measurement instants, setting the calibration time interval between two consecutive measurement instants to a longer value.

4. The arrangement according to claim 3, wherein the arrangement comprises:
resetting the predetermined reference time instant, when the calibration time interval has been set to a different value, allowing cumulative drift observation only with the reset calibration time interval.

5. The arrangement according to claim 1, wherein the controller illustrates the cumulative drift values as a function of time or as a function of calibration instants in user output means.

6. The arrangement according to claim 1, wherein the controller forecasts future drift based on the cumulative drift variations.

7. The arrangement according to claim 1, wherein the controller observes whether the cumulative drift accelerates or decelerates during a preset longer period of time.

8. The arrangement according to claim 7, wherein the controller triggers an alarm to a user of the calibrator if a positive observation result is obtained.

9. The arrangement according to claim 1, wherein the controller observes whether there are oscillations in the cumulative drift during a preset longer period of time.

10. A method to detect and store cumulative drift in measurements performed by a measurement device, the method comprising the steps of:
connecting a calibrator to the measurement device at given time instants, wherein the calibrator measures at least one quantity at given measurement instants,
saving respective measurement results into a memory, if a measurement error of the respective measurement result exceeds a predetermined threshold value,
correcting the respective measurement result by the calibrator within a respective measurement instant according to an adjustment step,
comparing, in a controller, the unadjusted result of the measurement instant to the adjusted result of a previous measurement instant, thus obtaining a latest drift value during a latest calibration time interval between two consecutive measurement instants,
updating, in the controller, a cumulative drift value in the memory by summing the latest drift value to the previous cumulative drift value, which cumulative drift value then comprises the drift of the results of the measurement device occurred since an operation of the measurement device has started or since a predetermined reference time instant during an operation of the measurement device,
wherein a magnitude of the cumulative drift value and a number of measurement instants associated with the magnitude of the cumulative drift value are applied for changing the calibration time interval of the measurement device.

11. The method according to claim 10, wherein the method comprises the step of performing, by the controller, the summing for the cumulative drift value in each consecutive measurement instant independently of whether the correcting according to the adjustment step has been performed or not.

12. The method according to claim 10, wherein the method comprises the steps of deciding, by the controller,
if the cumulative drift value exceeds a drift threshold value in only some measurement instants, setting the calibration time interval between two consecutive measurement instants to a shorter value, and
if the cumulative drift value does not exceed a drift threshold value in more than a preset number of measurement instants, setting the calibration time interval between two consecutive measurement instants to a longer value.

13. The method according to claim 12, wherein the method comprises the step of:
resetting the predetermined reference time instant, when the calibration time interval has been set to a different value, allowing cumulative drift observation only with the reset calibration time interval.

14. The method according to claim 10, wherein the method comprises the step of
illustrating, by the controller, the cumulative drift values as a function of time or as a function of calibration instants in user output means.

15. The method according to claim 10, wherein the method comprises the step of
forecasting, by the controller, future drift based on the cumulative drift variations.

16. The method according to claim 10, wherein the method comprises the step of
observing, by the controller, whether the cumulative drift accelerates or decelerates during a preset longer period of time.

17. The method according to claim 16, wherein the method comprises the step of
triggering, by the controller, an alarm to a user of the calibrator if a positive observation result is obtained.

18. The method according to claim 10, wherein the method comprises the step of
observing, by the controller, whether there are oscillations in the cumulative drift during a preset longer period of time.

19. A non-transitory computer program product to detect and store cumulative drift in measurements performed by a measurement device, where the computer program product comprises program code adapted to perform the following steps, when the computer program is executed on a processor of a data processing device:
after connecting a calibrator to the measurement device at given time instants, measuring at least one quantity at given measurement instants, and
saving respective measurement results into a memory, and
if a measurement error of the respective measurement result exceeds a predetermined threshold value,
correcting the respective measurement result by the calibrator within a respective measurement instant according to an adjustment step,
comparing, in a controller, an unadjusted result of the respective measurement instant to the adjusted result of the previous measurement instant, thus obtaining a latest drift value during a latest calibration time interval between two consecutive measurement instants,
updating, in the controller, a cumulative drift value in the memory by summing the latest drift value to the previous cumulative drift value, which cumulative drift value then comprises the drift of the results of the measurement device occurred since an operation of the measurement device has started or since a predetermined reference time instant during an operation of the measurement device, wherein a magnitude of the cumulative drift value and a number of measurement instants associated with the magnitude of the cumulative drift value are applied for changing the calibration time interval of the measurement device.

* * * * *